Nov. 18, 1930.  B. W. BOOTH  1,782,253
ANIMAL TRAP
Filed Aug. 21, 1929  2 Sheets-Sheet 1
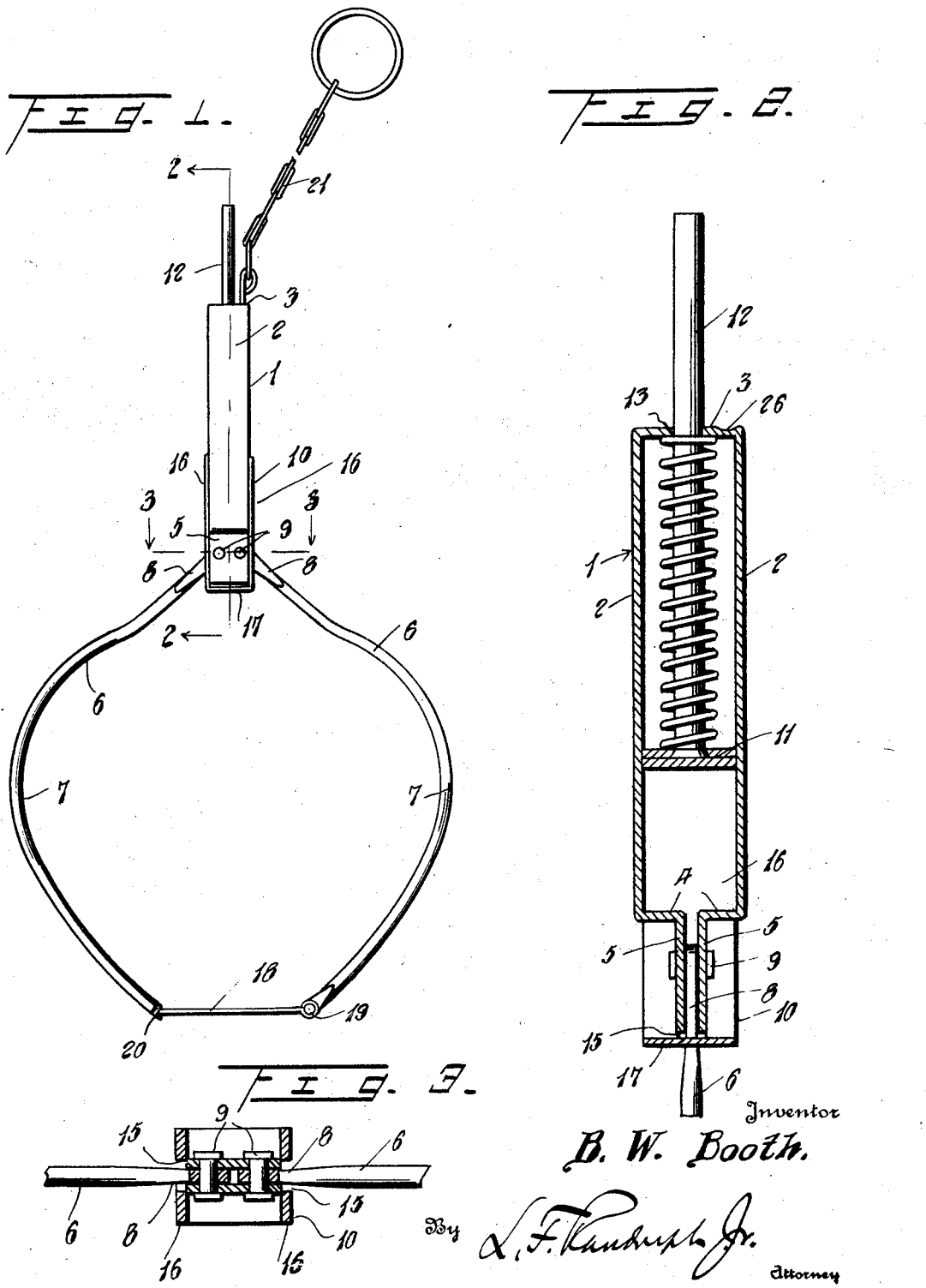
Inventor
B. W. Booth.

Nov. 18, 1930. B. W. BOOTH 1,782,253
ANIMAL TRAP
Filed Aug. 21, 1929 2 Sheets-Sheet 2
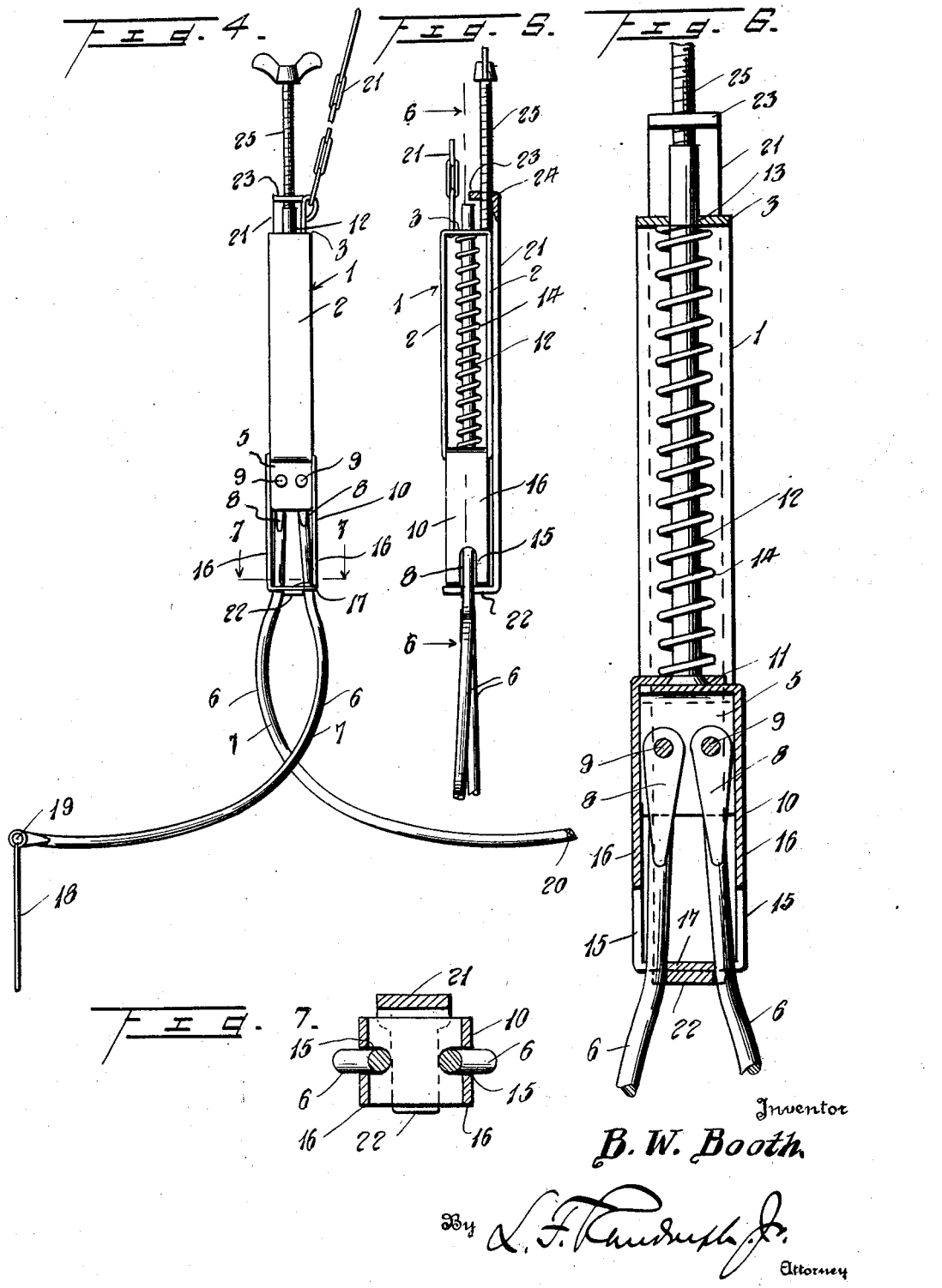

Patented Nov. 18, 1930

1,782,253

UNITED STATES PATENT OFFICE

BENJAMIN W. BOOTH, OF KETCHIKAN, ALASKA

ANIMAL TRAP

Application filed August 21, 1929. Serial No. 387,450.

The invention relates to traps for catching fur-bearing animals of the type disclosed in my Patent No. 1,467,832, dated September 11, 1923, being of the type adapted to catch and hold the animal about its body so as to prevent impairment of the value of the pelt as frequently happens with traps designed to clamp the foot or leg of the animal and also to prevent suffering of the animal occasioned by traps now generally in use.

The invention has for its object the provision of a trap, of the type stated, that because of the reduction of the number of working parts can be manufactured more reasonably than the patented trap referred to, and that is equally efficient in operation.

The invention will be described in detail hereinafter and will be found illustrated in the accompanying drawings in which Figure 1 is a front view of the trap in set position, Figure 2 is a sectional detail on a plane indicated by the line 2—2 of Figure 1, Figure 3 is a transverse sectional view on a plane indicated by the line 3—3 of Figure 1, Figure 4 is a view similar to Figure 1 showing the trap sprung and the trap setting device applied thereto for resetting it, Figure 5 is a fragmentary side view of the trap in the position shown in Figure 4, partly broken away and in section, Figure 6 is a sectional view on an enlarged scale on a plane indicated by the line 6—6 of Figure 5, and Figure 7 is a transverse sectional view on a plane indicated by the line 7—7 of Figure 4.

In the drawings similar reference characters are used to designate corresponding parts throughout the several views.

The improved trap comprises a body or frame member 1 that is preferably formed of a strip of metal bent into rectangular form and having spaced parallel side walls 2, an end wall 3, and the ends of the strip bent inwardly as shown at 4 and upwardly extended spaced extremities 5. 6 indicates the jaws of the trap that are preferably made of bars circular in cross section and outwardly bowed as shown at 7, and said jaws have flat portions 8 that are pivotally secured between the spaced extremities 5 as shown at 9. 10 indicates a plunger formed of a strip of metal bent into rectangular form and having its overlapped extremities 11 slidably mounted between the spaced sides 2 of the body 1 and secured to a rod 12 slidably mounted in an opening 13 in the end wall 3, 14 indicating an expansible coil spring enclosing the rod 12 and terminally engaging the plunger 10 and the end wall 3. The plunger 10 encloses the extremities 5 and the inturned portions 4, the body 1 and the pivoted ends of the jaws 6, and is provided with a slot 15 in the outer portion of the side wall 16 and the outer end wall 17 of the plunger 10 through which the jaws 6 extend. When the plunger is in a sprung position as shown in Figures 4, 5, and 6, it will be apparent that the pivoted ends of the jaws 6 will be drawn within the plunger frame 10 and be held in closed or clamping position by means of the side walls 16 of said plunger.

The trap is set by compressing the spring 14 so as to withdraw the end 11 of the plunger 10 toward the end 3 of the body portion 1 so that the parts are in the position shown in Figures 1 and 2, and is held in set position by means of a trigger member comprising a rod 18 pivotally secured as shown at 19 to one of the jaws 6 and having its other end engaging in a recess 20 in the extremity of the other jaw 6. When so set the trap is adapted to be suspended by means of a chain or other flexible member 21 from any suitable support such for instance as a limb of a tree or a convenient bush over the trail followed by the animal to be trapped, it being purposely arranged that the jaws will be substantially concealed by a low growth such for instance as bushes at the sides of the trail, the lower ends of the jaws being so arranged that they are about four inches from the ground. The trigger member 18 is very sensitive so that the least engagement therewith or with either of the jaws 6 will trip the trigger and the action of the spring 14 will withdraw the pivoted ends of the jaws 6 within the plunger 10 thus clamping and adequately holding the animal between the jaws and preventing him from releasing himself and at the same time the animal is not subjected to suffering.

The invention also contemplates the provision for resetting the trap comprising a bar 21 having a flange 22 at one of its ends adapted to engage the end wall 17 of the plunger 10, and another flange 23 at its other end having a threaded opening 24 therein in which is mounted a screw 25 adapted to engage the end wall 3 of the body 1 and by turning the screw 25 the plunger 10 will be moved towards the end wall 3 of the body 1 and the spring 14 compressed, the parts finally moving into position shown in Figures 1 and 2 when the jaws 6 may be set in open position by the trigger member 18 after which the trap setter is removed by unscrewing the member 25. The end wall 3 is provided with a recess 26 to receive the forward end of the screw 25 to hold the trap setting device from slipping while in operation.

What is claimed is:—

1. In a trap, a body member having its opposite sides open, jaws pivotally secured to said body member, a plunger slidably mounted in said body member, said plunger having portions extending through the openings in the body member and provided with slotted openings engaging said jaws, spring means normally urging said plunger to close said jaws, and means pivotally engaging one of said jaws and releasably engageable with the other jaw to hold the jaws distended.

2. In a trap, a body member consisting of a strip of material bent intermediate of its ends to an open rectangular shape, the terminals of said strip being spaced, jaws pivoted between said terminals, a plunger consisting of a strip of material bent intermediate of its ends to an open rectangular shape, having overlapping ends located in the rectangular body member and slots receiving said jaws, a rod secured to said overlapping ends, said rectangular body member having an opening slidably receiving said rod, an expansible coil spring mounted on said rod and terminally engaging the body member and plunger to normally move the plunger relatively to the body member to close the jaws, and a trigger pivotally engaging an end of one of said jaws and in engagement with the other jaw to hold the jaws distended and the spring under compression.

In testimony whereof I affix my signature.

BENJAMIN W. BOOTH.